(12) United States Patent
Ellis et al.

(10) Patent No.: US 6,468,012 B2
(45) Date of Patent: *Oct. 22, 2002

(54) CAPTIVE SCREW

(75) Inventors: Thomas J. Ellis, Wilmington, DE (US); Edward A. McCormack, Chadds Ford; Harry L. Dickerson, Downingtown, both of PA (US)

(73) Assignee: Southco, Inc., Concordville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,940

(22) Filed: Jul. 24, 2001

(65) Prior Publication Data

US 2001/0041110 A1 Nov. 15, 2001

Related U.S. Application Data

(63) Continuation of application No. 09/224,129, filed on Dec. 17, 1998, which is a continuation of application No. 09/059,577, filed on Apr. 14, 1998, now Pat. No. 5,851,095.

(51) Int. Cl.[7] .......................... F16B 21/18; F16B 39/00
(52) U.S. Cl. ..................... 411/353; 411/107; 411/396; 411/970; 411/999
(58) Field of Search ................ 411/107, 352, 411/353, 383, 396, 552, 970, 999

(56) References Cited

U.S. PATENT DOCUMENTS

| 436,532 A | 9/1890 | Glover |
|---|---|---|
| 748,078 A | 12/1903 | Kaisling |
| 1,166,345 A | 12/1915 | Gates |
| 1,188,420 A | 6/1916 | Eadie |
| 1,664,820 A | 4/1928 | Hughes |
| 2,006,359 A | 7/1935 | Lackner |
| 2,151,255 A | 3/1939 | Witchger |
| 2,331,322 A | 10/1943 | Heinick |
| 2,464,133 A | 3/1949 | Herbert |
| 2,470,927 A | 5/1949 | Hale, Jr. |
| 2,503,189 A | 4/1950 | Biba, Jr. |
| 2,553,236 A | 5/1951 | Bratfisch |
| 2,773,574 A | 12/1956 | Able |
| 2,831,520 A | 4/1958 | Clarke |
| 2,967,557 A | 1/1961 | Acres |
| 2,987,811 A | 6/1961 | Tait et al. |
| 3,033,260 A | 5/1962 | Snow |
| 3,052,942 A | 9/1962 | Mulvaney |
| 3,056,197 A | 10/1962 | Lawson |
| 3,059,736 A | 10/1962 | Boyd |
| 3,074,292 A | 1/1963 | Polman |
| 3,126,935 A | 3/1964 | Touzzo |

(List continued on next page.)

FOREIGN PATENT DOCUMENTS

| CA | 558456 | 6/1958 |
|---|---|---|
| CA | 766082 | 8/1967 |

(List continued on next page.)

OTHER PUBLICATIONS

Catalog—Huck International, Inc., Lakewood, CA. 90712 "Captive Fasteners and Rivetless Nut Plates", Index Tag "Captive Screws, Press–In Type" Code ID #97928 Deutschsert, Press–In Captive Screw (one page), Jan. 1994.*
"Southco Latches and Acess Hardware, Handbook 43", pp. C1–C11, C18–C27, (Pennsylvania) 1993.

(List continued on next page.)

Primary Examiner—Neill Wilson
(74) Attorney, Agent, or Firm—Paul & Paul

(57) ABSTRACT

A captive screw attachable an upper panel, for attaching the upper panel to a lower surface, the lower surface having a threaded hole, the captive screw having a screw, a ferrule that attaches to the upper panel, a thin-walled, cylindrical hollow knob and protrusions integral to the outer perimeter of the head portion of the screw to rigidly secure the perimeter of the head of the screw to the inner surface of the knob, the protrusions providing a press-fit of the screw to the inner surface of the knob where the screw is pressed into the knob from the underside of the knob.

14 Claims, 5 Drawing Sheets

U.S. PATENT DOCUMENTS

| | | |
|---|---|---|
| 3,137,336 A | 6/1964 | Wing |
| 3,180,389 A | 4/1965 | Frank |
| 3,195,600 A | 7/1965 | Middleton, Jr. |
| 3,204,680 A | 9/1965 | Barry |
| 3,209,807 A | 10/1965 | Ryner |
| 3,244,212 A | 4/1966 | Barry |
| 3,245,450 A * | 4/1966 | Sauter .................... 411/353 X |
| 3,250,559 A | 5/1966 | Sommerfeld |
| 3,263,728 A | 8/1966 | Lynch |
| 3,279,302 A | 10/1966 | Modrey |
| 3,343,581 A | 9/1967 | Martin et al. |
| 3,346,032 A * | 10/1967 | Gulistan ................. 411/999 X |
| 3,385,341 A | 5/1968 | Garstkiewicz |
| 3,437,119 A | 4/1969 | Dey |
| 3,465,803 A | 9/1969 | Ernest et al. |
| 3,502,130 A * | 3/1970 | Gulistan ................. 411/353 X |
| 3,564,563 A | 2/1971 | Trotter et al. |
| 3,571,904 A | 3/1971 | Gulistan |
| 3,718,950 A | 3/1973 | Engstrom |
| 3,892,031 A | 7/1975 | Bisbing |
| 3,912,411 A | 10/1975 | Moffat |
| 3,958,308 A | 5/1976 | Gooding |
| 4,007,516 A | 2/1977 | Coules |
| 4,047,266 A | 9/1977 | Bisbing |
| 4,078,414 A | 3/1978 | Orain |
| 4,367,643 A | 1/1983 | Hackett |
| 4,387,497 A | 6/1983 | Gulistan |
| 4,398,322 A | 8/1983 | Ewen |
| 4,399,682 A | 8/1983 | Hackett |
| D283,591 S | 4/1986 | Swanstrom |
| 4,594,040 A | 6/1986 | Molina |
| 4,602,903 A | 7/1986 | Wilburn |
| 4,692,075 A | 9/1987 | Metz |
| 4,863,326 A | 9/1989 | Vickers |
| 4,915,557 A | 4/1990 | Stafford |
| 4,952,107 A | 8/1990 | Dupree |
| 4,964,773 A | 10/1990 | Schmidt |
| 4,975,007 A | 12/1990 | Molina |
| 5,042,880 A | 8/1991 | Wilburn |
| 5,094,579 A | 3/1992 | Metz |
| 5,146,668 A | 9/1992 | Gulistan |
| 5,209,018 A | 5/1993 | Heinrich |
| 5,336,028 A | 8/1994 | Yamamto |
| 5,338,139 A | 8/1994 | Swanstrom |
| 5,382,124 A * | 1/1995 | Frattarola .................... 411/352 |
| D357,176 S | 4/1995 | Ernest et al. |
| 5,429,467 A | 7/1995 | Gugle et al. |
| 5,544,992 A * | 8/1996 | Ciobanu et al. ............ 411/353 |
| D374,172 S | 10/1996 | Frattarola |
| 5,611,654 A | 3/1997 | Frattarola |
| 5,642,972 A * | 7/1997 | Ellis et al. .............. 411/107 X |
| D388,316 S | 12/1997 | McDonough et al. |
| 5,851,095 A | 12/1998 | Ellis et al. |
| 5,865,582 A | 2/1999 | Ellis et al. |
| 5,910,052 A | 6/1999 | Ellis et al. |
| 5,941,669 A | 8/1999 | Aukzemas |

FOREIGN PATENT DOCUMENTS

| | | |
|---|---|---|
| FR | 1339942 | 11/1962 |
| FR | 2268977 | 4/1975 |
| FR | 2578009 | 2/1986 |
| FR | 2636384 | 9/1988 |
| GB | 625345 | 6/1949 |
| GB | 626013 | 9/1949 |
| GB | 825877 | 12/1959 |
| GB | 1579730 | 11/1980 |

OTHER PUBLICATIONS

"Southco Latches and Acess Hardware, Handbook 45 NA", pp. B19–B22 and C1–C44 (Pennsylvania, 1995).

"Southco Latches and Acess Hardware, North American Edition—48 NA", 1998, pp. B6, C1–C55.

"SouthcoHandbook 2000", 1999, Captive Fasteners & Captive Screws pp. 193–255.

"Southco Handbook 2002", 2001, Captive Fasteners & Captive Screws pp. 201–259.

Penn Engineering & Manufacturing Corp., "Fasteners for Use In or With PC Boards", Pem Bulletin K–488, (Danboro, PA) 1980.

Penn Engineering & Manufacturing Corp., "Snap–Top Standoffs", Pem Bulletin SSA–988, (Danboro, PA) 1987.

Penn Engineering & Manufacturing Corp., "type PF11 Self –Clinching Panel Fastener Assembly", Pem Bulletin PF11–297, (Danboro, PA) 1997.

Penn Engineering & Manufacturing Corp., "Fastener Guide –PEM's 1996 Catalog" (Danbury, PA).

Camloc Fasteners, "Captive Screws", Catalog No. 3800, pp. 1–12 (Hasbrouk Heights, NJ).

"American Society for Metals, Source Book on Cold Forming", pp. 83–87 (Ohio, 44073).

Huck International, Inc. "Captive Fasteners and Rivetless Nut Plates", (California, 90712, 1996).

Huck International, Inc., Deutschsert, Press–in Captive Screw, Floating, Retractable, Drawing No. S–3206, Lakewood, CA 1994.

"Micro Plastics, Inc., Microplates Brochure, Polycarbonate Fasteners", (Flippin, AR).

"Micro Plastics, Inc., Standard Parts Catalog", pp. 1–16, (Flippin, AR).

Unicorp, Received May 5, 1983, Contents page, Captive Screw #1 & 6.

Matdan American Corporation, 1994 catalog, pp. I–III, 211–214, 245–246 (New Jersey).

\* cited by examiner

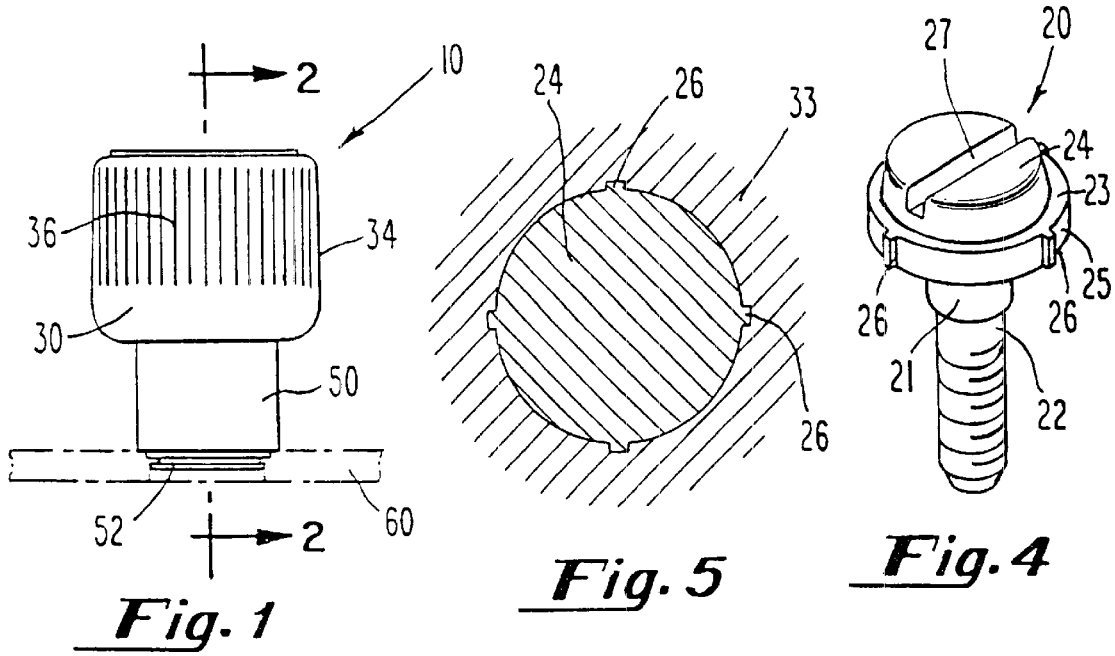
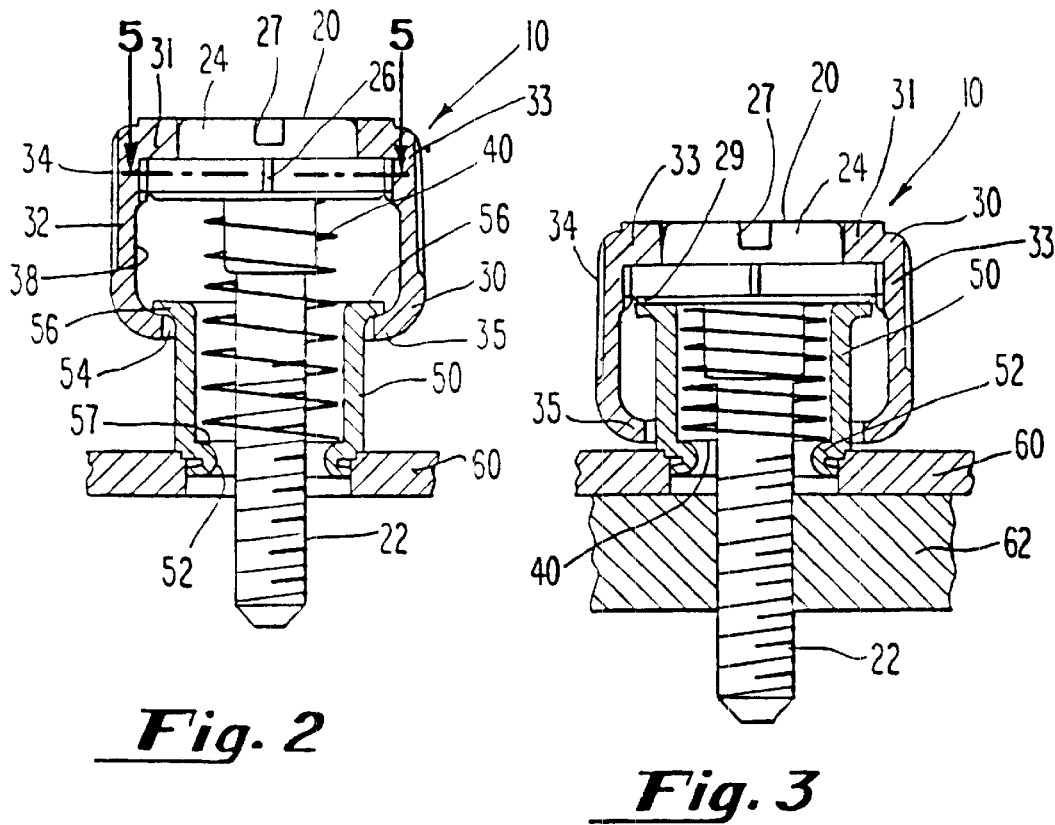

CAPTIVE SCREW

CROSS-REFERENCE TO RELATED APPLICATIONS

This application is a continuation of U.S. patent application Ser. No. 09/224,129, filed Dec. 17, 1998, which is a continuation of U.S. patent application Ser. No. 09/059,577, filed Apr. 14, 1998, now U.S. Pat. No. 5,851,095.

BACKGROUND OF THE INVENTION

This invention relates to captive screws of the type generally used to attach a first panel to a second panel, frame or other surface wherein it is desired to keep the fastener in position on the first panel without loose items of hardware. The captive screw is mounted to the upper panel such that the screw stays attached to the panel even when the threads of the screw are fully disengaged from a threaded hole in the second panel to which the first panel is attached.

The present invention is directed toward a new and improved captive screw of a type which has a knob, a screw, and a ferrule. The captive screw is captivated on a panel by the ferrule and as the screw is screwed into a second panel the knob telescopically retracts over the ferrule. A spring may be used which urges the knob and integral screw to its fully retracted position when the captive screw is not attached to the second panel, thereby withdrawing the threads of the screw from the area of the lower panel.

Captive screws of the foregoing type in general are disclosed in, for example, Frattarola, U.S. Pat. No. 5,382,124 and French Patent 1,339,942. These patents depict captive screws of the general type herein but contain different configurations where the screw head mates integrally with the knob of the captive screw.

SUMMARY OF THE INVENTION

This invention relates to a low profile, retractable captive screw of the type wherein a first panel or other thin flat surface is to be mounted against another surface, such as a second panel or frame. The captive screw of the present invention has a unique configuration in the means by which the screw portion of the captive screw is mounted to the knob of the captive screw. The screw is attachable to the first panel, and is used for attaching the first panel to a lower surface, the lower surface having a threaded hole. The captive screw has a screw with or without an added flange surrounding the periphery of the head of the screw with protrusions integral to the outer perimeter of the screw head or flange, a thin-walled, cylindrical hollow knob that rigidly attaches to the screw, a ferrule that attaches to the upper panel and to the knob, and a spring. The flange with the protrusions or the screw head with the protrusions rigidly secures the screw head to the inner surface of the knob and provides a press-fit of the screw to the inner surface of the knob. The flange, if used, provides significant advantages in that it provides for a positive stop when the screw is pressed into the knob. Further, the screw head is installed into the knob from the bottom side of the knob rather than the top side of the knob as in similar prior art screws, providing further advantages as described below.

A second means for attachment of the screw to the knob allows for a press fit of the screw into the knob by filling in a chamfer on the periphery of the screw with material from the inner surface of the knob. This new construction provides significant structural advantages over prior art captive screws. The screw applies force directly through the ferrule rather than through a portion of the knob as in some similar prior art screws. The construction of the knob/screw interface allows for insertion of the screw into the bottom of the knob, rather than the top of the knob. In failure of the knob screw interface, the captive screw of the present invention still retains the panels to which the captive screw is attached. Even if the knob breaks free of the screw while the screw is in the open position, the knob is still retained on the screw, the screw is retained in the captive screw assembly, and the screw functions.

It is therefore an object of the present invention to provide a captive screw that provides for an improved, stronger knob/screw interface.

It is a further object of the present invention to provide a captive screw that provides for an improved, stronger knob/screw interface that provides for more surface area and therefore a stronger assembly, particularly when the captive screw is pressed onto a panel.

Other objects and advantages of the present invention will become apparent from the following description taken in conjunction with the accompanying drawings.

BRIEF DESCRIPTION OF THE DRAWINGS

FIG. 1 is a side elevation view of the captive screw embodying the present invention, with the knob in the extended position.

FIG. 2 is a cross-sectional view of the captive screw of FIG. 1 taken along line 2—2 of FIG. 1.

FIG. 3 is the cross-sectional view of the captive screw of FIG. 2 with the knob in the depressed position with the screw in a fully extended position.

FIG. 4 is a perspective view of a screw as used in the captive screw of FIG. 1.

FIG. 5 is a cross-sectional view of the captive screw of FIG. 1, taken along line 5—5 of FIG. 2.

DESCRIPTION OF THE PREFERRED EMBODIMENT

Figure 6A:
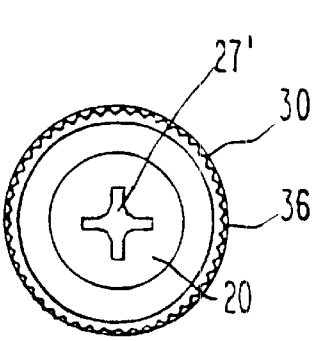
FIG. 6a is a top view of the captive screw of FIG. 1 depicting a Phillips screwdriver recess.
Figure 6B:
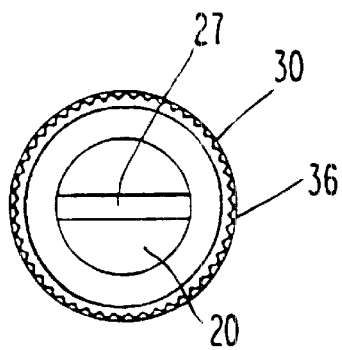
FIG. 6b is a top view of the captive screw of FIG. 1 depicting a slotted screwdriver recess.
Figure 6C:
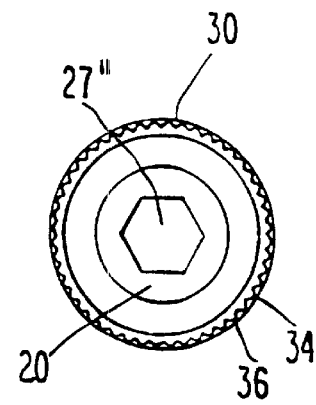
FIG. 6c is a top view of the captive screw of FIG. 1 depicting a hex driver recess.

Referring now in detail to the drawings wherein like reference numbers indicate like elements throughout the several views, there is shown in FIGS. 1, 2 and 3 a retractable captive screw 10 in accordance with one preferred embodiment of the present invention. The illustrative device is shown generally comprising a screw 20 having a threaded shaft 22 and a screw head 24, a generally cylindrical thin-walled hollow knob 30, a spring or other biasing means 40, a generally cylindrical hollow ferrule 50, with a panel attachment means 52, and a screw captivation means 54. The illustrative device is shown in FIGS. 1, 2 and 3 as installed on a first panel 60. FIG. 3 depicts the captive screw as installed on a first panel 60 and screwed into second panel 62.

The generally cylindrical, partially hollow knob 30 has a hollow cylindrical body 32 that preferably has a region of increased thickness 33 near the upper end of the knob 30 and a top annular surface 31 against which the head 24 of screw 20 sits. As seen in FIG. 4, the screw 20 has an annular flange 23 around the lower end of the screw head 24 and a plurality of protrusions 26 integral to an outer perimeter 25 of the annular flange 23 around screw head 24. These protrusions 26 provide a press-fit to the region of increased thickness 33 on the inner surface of the knob 30 whereby material in the knob 30, which is preferably made from a soft material relative to the screw head 24 such as aluminum, is displaced by the protrusions 26 of the screw 20, which is made from a relatively hard material, such as stainless steel. The screw 20 is thereby rigidly secured to the knob 30.

It has been found that approximately four protrusions 26, evenly spaced around the outer circumference of the screw head 24 are satisfactory for purposes of the present invention. Additionally, it has been found that the protrusions 26 may be generally square or rectangular in cross-section. A multitude of variations in the quantity and cross-sectional shape of the protrusions 26 will likely also produce satisfactory results so long as the screw head 24 is rigidly attached to the knob 30 when properly installed. The above has been found to be the optimal configuration.

Figure 10:
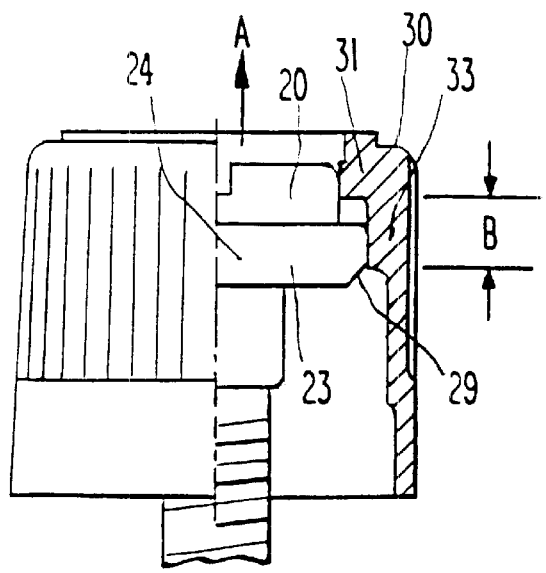
FIG. 10 is a partially cut away side elevation view of a knob/screw assembly as used on the captive screw of FIG. 1, with the optional additional chamfer of the screw as a knob/screw retention means, during the assembly of the knob and the screw.
Figure 11:
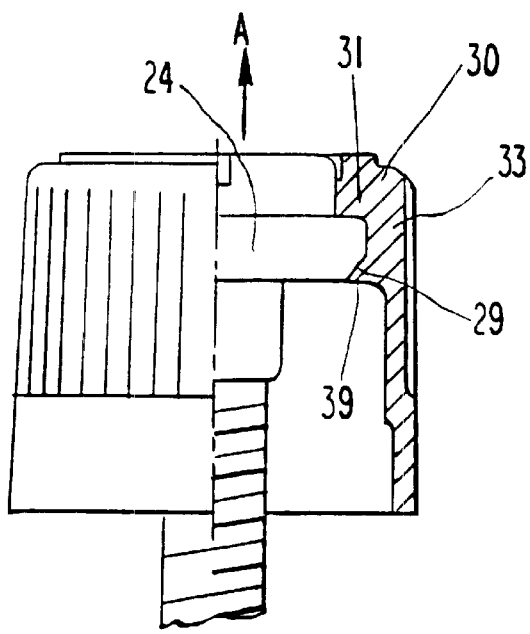
FIG. 11 is a partially cut away side elevation view of the knob/screw assembly of FIG. 10, upon completion of the knob/screw assembly.

Additionally, further structure may optionally be provided to further secure the knob 30 to the screw head 24 as can be seen in FIGS. 10 and 11. At the lower surface of the annular flange 23 of the screw 20 is an optional chamfer 29. A chamfer of .025 inches at, for example, approximately fifteen to thirty degrees has been found to be suitable for most screw sizes. FIG. 10 depicts a knob/screw assembly during the pressing-in of the screw prior to the point where the screw has been fully pressed-in to the knob 30. Note that the protrusions 26 as described above are not shown in FIGS. 10 and 11. The protrusions 26 may or may not be used. As the screw head 24 is pressed further into the inner surface of the knob 30 in direction of arrow A in FIGS. 10 and 11, material from the lower end of the region of increased thickness of the knob 33 is pressed such that the material flows into the chamfer 29 area such that this annular ring of material 39 holds the screw head 24 to the knob 30. The region of increased thickness 33, i.e. the distance between the top annular surface 31 or cap section of the knob 30 and the bottom of the region of increased thickness 33 of the knob 24 (Distance B in FIG. 10), is slightly longer in its axial dimension than the total thickness of the annular flange 23 around the screw head such that, while the screw head 24 is pressed into the knob 30 in direction A, the knob material flows into the area of the chamfer 29 and then is positively stopped.

Figure 8:
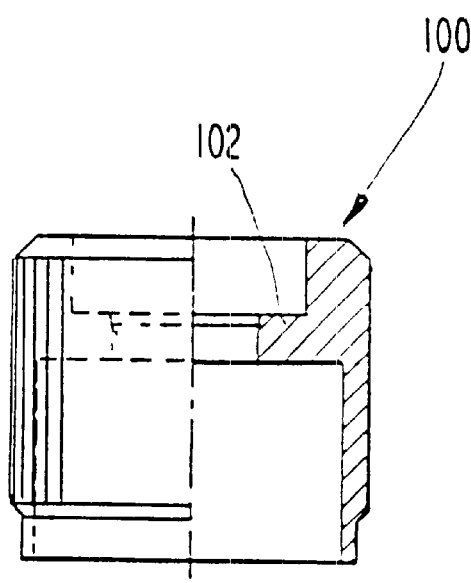
FIG. 8 is a partially cut away side elevation view of a knob as used on a prior art captive screw, prior to assembly with a ferrule, spring and screw.
Figure 9:
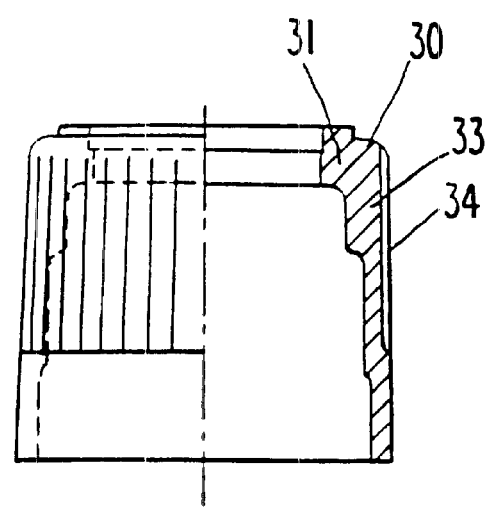
FIG. 9 is a partially cut away side elevation view of a knob as used on the captive screw of FIG. 1, prior to assembly with the ferrule, spring and screw.

Previous captive screws typically had more complex knob shapes in the interior of the knob. For example, as depicted in FIG. 8 which shows a prior art knob 100 prior to its assembly during manufacturing, annular surface 102 is used which holds a screw in place (not shown). This screw is pressed into place in the knob 100 and is held in place by a splined section below the screw head. This arrangement is shown in more detail in FIG. 1 of U.S. Pat. No. 5,382,124. That annular surface 102 is not required in the present captive screw since the screw 20 is held in place at the perimeter of the screw head flange 23. As shown in FIG. 9, the knob 30 of the present invention has a more simple internal design. The annular surface 102 of the prior art knob 100 is no longer used since the screw 20 of the present invention is held in place by the protrusions 26 on the outer perimeter of the screw head 24 or flange 23 as can be seen in FIGS. 1–5, and/or the chamfer 29 as described above and seen in FIGS. 10 and 11, rather than the splined section on the screw shaft of the prior art.

Significant structural advantages of the present screw exist over prior captive screws having the annular flange within their knobs. In the present captive screw 10, the bottom annular surface of the screw 20 is in direct contact with the ferrule when the screw is in the fully extended position, i.e. when the first panel 60 is screwed down to the second panel 62 as depicted in FIG. 3. The load of the screw 20 runs directly from screw 20 to ferrule 30 to panel 60. This eliminates any breakage problems of the prior art knob annular flange 102 during both assembly of the screw 20 to the knob 30 and during use of the captive screw 10 of the present invention. Additionally, the flange 23 provides a positive stop during the assembly of the screw 20 to the knob 30. This provides for extremely tight tolerances and reliability with respect to the structural integrity of the captive screw. Additionally, the added surface area where the flange 23 bears against the ferrule 30 provides increased structural integrity, particularly during the installation of the screw 10 to a panel 60.

The screw 20 also has an optional region of increased shaft thickness 21 in the area of the screw shaft 22 adjacent the screw head 24 or flange 23. This region of increased shaft thickness provides two valuable functions. First, it simplifies manufacturing of the screw since, the step-up in diameter from the screw shaft to the outer perimeter of the screw head 24, particularly if the flange 23 is used, is particularly difficult to manufacture. Second, it provides for increased volume of material where a Phillips style screw driver recess (see FIG. 6a) or a Torx style (not shown) recess is used.

Figure 7A:
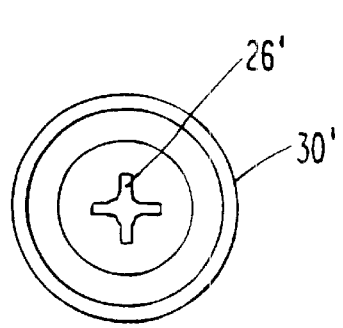
FIG. 7a is a top view of an alternate embodiment of the captive screw of FIG. 1 having a smooth knob and a Phillips screwdriver recess.
Figure 7B:
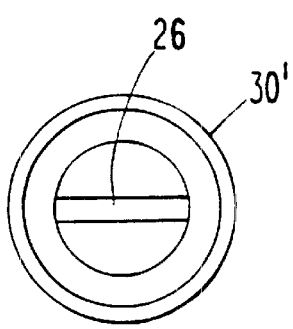
FIG. 7b is a top view of an alternate embodiment of the captive screw of FIG. 1 having a smooth knob and a slotted screwdriver recess.
Figure 7C:
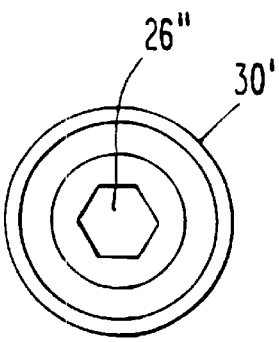
FIG. 7c is a top view of an alternate embodiment of the captive screw of FIG. 1 having a smooth knob and a hex driver recess.

The remaining structure of a typical captive screw of the present invention is preferably as follows. Integral to the head 24 of the screw 20 is a driving recess, for example, a recessed slot 27 (see FIGS. 2–4, 6b, and 7b), for use with a slotted-type screwdriver. As shown in FIGS. 6a, 6c, 7a, and 7c, alternate embodiments may include a Phillips-type recess 27' for use with a Phillips-type screwdriver, a socket recess 27" for use with a socket wrench or any other drive recess as is known in the art, for example a Torx recess. Optionally, disposed on the outer circumferential surface 34 of the knob 30 are axial scored lines 36 to facilitate tightening of the retractable captive screw 10 using only fingers, without tools, or to facilitate the initial alignment of the screw threads 22 with a threaded hole in a second panel 62. Alternate embodiments may include a knurling pattern or other frictional surface (not shown) or a smooth surface knob 30' such as that shown in FIGS. 7a, 7b, and 7c.

As can be seen in FIGS. 2 and 3, the knob 30 is attached to the ferrule 50, however, full rotational movement of the knob 30 with respect to the ferrule 50, and a limited amount of axial movement of the knob 30 with respect to the ferrule 50, preferably corresponding to screw engagement length, are provided. The limited axial movement is accomplished by a first annular flange 35 on the knob 50 extending inward from the inner surface 38 of the hollow knob 30 towards the threaded shaft 22, in combination with a second annular flange 56, integral to the ferrule 50, extending outward from the body of the ferrule 50 at the knob end or first end of the ferrule 50. The inside surface 38 of the hollow knob 30 has a larger diameter than the outside diameter of the ferrule annular flange 56 such that a portion of the ferrule 50 is slidable within the hollow cylindrical body 32 of the knob 30. When the captive screw 10 is engaged, i.e. when two panels are rigidly connected by the captive screw 10, the upper end of the ferrule 50 is inserted into the hollow cylindrical body of the knob 30. The first and second annular flanges 35 and 56 allow the knob 30 and the ferrule 55 to be a single, non-detachable assembly, while allowing for radial and axial movement of the knob 30 with respect to the ferrule 50.

Encased between the lower end of the ferrule 50 and the head 24 of the screw 20 is a spring 40. Preferably at the lower end or second end of the ferrule 50, adjacent the panel attachment means 52, is an annular surface 57 protruding inwardly toward the axial center of the ferrule. This annular surface 57 serves to function as a termination point for one end of spring 40. The opposite end of spring 40 is terminated at the underside of screw head 24, as depicted in FIGS. 2 and 3. When the spring 40 is in its most compressed position as shown in FIG. 3, the knob 30 is at its lowest position, i.e. the upper end of the ferrule 50 is in contact with the underside of the screw head 24. Here, the screw 20 is inserted in the lower panel to its limit. When the spring 40 is in its most uncompressed condition as shown in FIG. 2, the screw 30 is at its most extended position, i.e. the first annular flange 35 on the knob 30 and the second annular flange 56 on the ferrule are in contact with each other as described above.

The panel attachment means 52 may be any such means known in the art, e.g. press-in as depicted in the present figures, snap-in as depicted in U.S. Pat. No. 5,382,124, swaged, screwed, or the like, as is known in the art.

The new knob/screw interface allows the steel screw 20 to directly contact the steel or aluminum ferrule over a wider area due to the increased width of the annular flange 23, thereby eliminating the aluminum/steel interface of some prior captive screws. This area of increased surface provides improved structure for pressing the captive screw into a panel 60.

Figure 13:
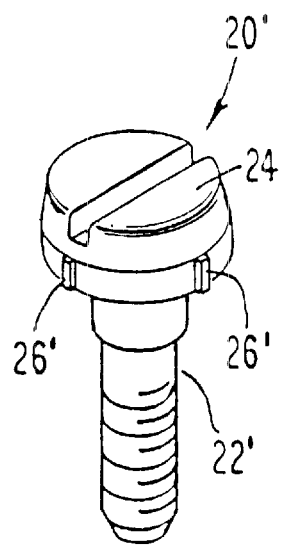
FIG. 13 is a perspective view of an alternate embodiment of a screw as used in the captive screw of FIG. 12.
Figure 12:
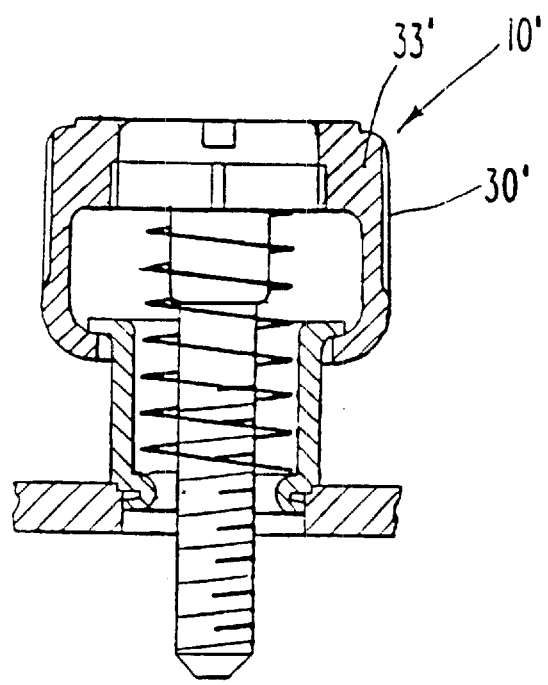
FIG. 12 a side elevation view of an alternate embodiment of the captive screw embodying the present invention, with the knob in the extended position.

An alternate embodiment 10' of the captive screw of the present invention is depicted in FIGS. 12 and 13. Here, there is no annular flange 23 as depicted in the first embodiment, for example, as shown in FIGS. 2 and 4. Here again, there are a plurality of protrusions 26' that are pressed into place in a region of increased thickness 33' of knob 30'. The advantages described above for the first embodiment specifically with respect to the additional annular flange 23 are reduced, however, this embodiment can be manufactured less expensively due to the reduced complexity. This embodiment does retain the advantages of the structure by virtue of the fact that the screw installs through the bottom of the knob, rather than the top, as in prior art screws.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A captive screw attachable to a panel, for attaching the panel to a surface, the surface having a threaded hole, the captive screw comprising:

a) a screw having a head portion and a shaft having at least a threaded portion, said head portion having an outer perimeter and a plurality of protrusions provided on said outer perimeter of said head portion;

b) a knob having an inner surface, wherein said protrusions rigidly secure said head portion to said inner surface of said knob; and c) a ferrule having a first end and a second end through which said shaft extends, said ferrule having a panel attachment means at said first end to secure the captive screw to the panel.

2. The captive screw according to claim 1, wherein said head portion has a top surface and a flat, annular bottom surface, said head portion further has an annular chamfer peripheral to said annular bottom surface of said head portion, and material from said knob fills said chamfer.

3. The captive screw according to claim 2, wherein said knob has a top annular surface against which said head portion of said screw sits.

4. A captive screw attachable to a panel, for attaching the panel to a surface, the surface having a threaded hole, the captive screw comprising:

a) a screw having a head portion and a shaft having at least a threaded portion, said head portion having a top surface and a flat, annular bottom surface, said head portion further having an annular chamfer peripheral to said annular bottom surface of said head portion;

b) a knob secured to said head portion, wherein material from said knob fills said chamfer; and c) a ferrule having a first end and a second end through which said shaft extends, said ferrule having a panel attachment means at said first end to secure the captive screw to the panel.

5. The captive screw according to claim 4, wherein said knob has a top annular surface against which said head portion of said screw sits.

6. A captive screw attachable to a panel, for attaching the panel to a surface, the surface having a threaded hole, the captive screw comprising:

a) a screw having a head portion and a shaft having at least a threaded portion, said head portion having an outer perimeter and a plurality of protrusions provided on said outer perimeter of said head portion;

b) a knob secured to said head portion and having an inner surface, said protrusions matingly engaging said inner surface of said knob to thereby help rigidly secure said head portion to said inner surface of said knob; and c) a ferrule having a first end and a second end through which said shaft extends, said ferrule having a panel attachment means at said first end to secure the captive screw to the panel.

7. A captive screw attachable to a panel, for attaching the panel to a surface, the surface having a threaded hole, the captive screw comprising:

a) a screw having a head portion and a shaft having at least a threaded portion, said head portion having a top surface and a bottom surface, said head portion further having an annular chamfer peripheral to said bottom surface of said head portion;

b) a knob secured to said head portion; and c) a ferrule having a first end and a second end through which said shaft extends, said ferrule having a panel attachment means at said first end to secure the captive screw to the panel.

8. The captive screw according to claim 7, wherein said head portion has an outer perimeter and a plurality of protrusions provided on said outer perimeter of said head portion, said knob has an inner surface, and said protrusions matingly engage said inner surface of said knob to thereby help rigidly secure said head portion to said inner surface of said knob.

9. The captive screw according to claim 8, wherein said bottom surface of said head portion is flat and annular, and said flat, annular bottom surface bears against said second end of said ferrule when said shaft is in a fully extended position, whereby a load on said screw is borne directly by said ferrule.

10. The captive screw according to claim 9, wherein said knob has a top annular surface against which said head portion of said screw sits.

11. The captive screw according to claim 7, wherein said head portion further has an annular chamfer peripheral to said annular bottom surface of said head portion, and material from said knob fills said chamfer.

12. The captive screw according to claim 11, wherein said knob has a top annular surface against which said head portion of said screw sits.

13. The captive screw according to claim 7, wherein said knob has a top annular surface against which said head portion of said screw sits.

14. The captive screw according to claim 13, wherein said head portion has an outer perimeter and a plurality of protrusions provided on said outer perimeter of said head portion, said knob has an inner surface, and said protrusions matingly engage said inner surface of said knob to thereby help rigidly secure said head portion to said inner surface of said knob.

* * * * *

(12) INTER PARTES REEXAMINATION CERTIFICATE (995th)
United States Patent
Ellis et al.

(10) Number: US 6,468,012 C1
(45) Certificate Issued: *Nov. 14, 2014

(54) CAPTIVE SCREW

(75) Inventors: Thomas J. Ellis, Wilmington, DE (US); Edward A. McCormack, Chadds Ford, PA (US); Harry L. Dickerson, Downingtown, PA (US)

(73) Assignee: Southco, Inc., Concordville, PA (US)

Reexamination Request:
No. 95/001,911, Feb. 29, 2012

Reexamination Certificate for:
Patent No.: 6,468,012
Issued: Oct. 22, 2002
Appl. No.: 09/911,940
Filed: Jul. 24, 2001

(*) Notice: This patent is subject to a terminal disclaimer.

Related U.S. Application Data

(63) Continuation of application No. 09/224,129, filed on Dec. 17, 1998, now Pat. No. 6,280,131, which is a continuation of application No. 09/059,577, filed on Apr. 14, 1998, now Pat. No. 5,851,095.

(51) Int. Cl.
*F16B 21/18* (2006.01)
*F16B 39/00* (2006.01)

(52) U.S. Cl.
USPC ........... 411/353; 411/107; 411/396; 411/970; 411/999

(58) Field of Classification Search
None
See application file for complete search history.

(56) References Cited

To view the complete listing of prior art documents cited during the proceeding for Reexamination Control Number 95/001,911, please refer to the USPTO's public Patent Application Information Retrieval (PAIR) system under the Display References tab.

*Primary Examiner* — Andres Kashnikow

(57) ABSTRACT

A captive screw attachable an upper panel, for attaching the upper panel to a lower surface, the lower surface having a threaded hole, the captive screw having a screw, a ferrule that attaches to the upper panel, a thin-walled, cylindrical hollow knob and protrusions integral to the outer perimeter of the head portion of the screw to rigidly secure the perimeter of the head of the screw to the inner surface of the knob, the protrusions providing a press-fit of the screw to the inner surface of the knob where the screw is pressed into the knob from the underside of the knob.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 8, 13 and 14 is confirmed.

Claims 1 and 6 are cancelled.

New claims 15-22 are added and determined to be patentable.

Claims 2-5 and 9-12 were not reexamined.

*15. A captive screw, for attaching a panel to a surface having a threaded hole, comprising:*
  *a) a screw having a head portion and a shaft having a threaded portion, said head portion having an outer perimeter and a plurality of protrusions provided on said outer perimeter of said head portion; said head portion having a flat, annular bottom surface, said head portion further having an annular chamfer peripheral to said annular bottom surface of said head portion; said head portion having a driving recess;*
  *b) a knob having a top annular surface, an outer surface, and an inner surface comprising knob material, said knob material is flowed into said chamfer, filling said chamfer and;*
  *c) said protrusions mated integrally with said inner surface of said knob to thereby rigidly secure said head portion to said knob, and;*
  *d) wherein said top annular surface of said knob defines an opening for driver access to said driving recess of said head portion of said screw; and*
  *e) a ferrule having a first end and a second end through which said shaft extends, said ferrule having a panel attachment means at said first end to secure the captive screw to the panel, wherein said screw can slide axially relative to said ferrule between a retracted position and an extended position.*

*16. The captive screw according to claim 15, wherein said head portion of said screw sits against said top annular surface of said knob.*

*17. The captive screw according to claim 15, wherein said flat, annular bottom surface of said head portion of said screw bears against said second end of said ferrule when said shaft is in said extended position, whereby a load on said screw is borne directly by said ferrule.*

*18. The captive screw according to claim 17, wherein said head portion of said screw sits against said top annular surface of said knob.*

*19. The captive screw according to claim 15, wherein said knob has a region of increased wall thickness and said protrusions matingly engage said region of increased wall thickness.*

*20. The captive screw according to claim 19, wherein said flat, annular bottom surface of said head portion of said screw bears against said second end of said ferrule when said shaft is in said extended position, whereby a load on said screw is borne directly by said ferrule.*

*21. The captive screw according to claim 20, wherein said head portion of said screw sits against said top annular surface of said knob.*

*22. A captive screw, for attaching a panel to a surface having a threaded hole, comprising:*
  *a) a screw having a head portion and a shaft having a threaded portion, said head portion having an outer perimeter and a plurality of protrusions provided on said outer perimeter of said head portion; said head portion having a flat, annular bottom surface, said head portion further having an annular chamfer peripheral to said annular bottom surface of said head portion; said head portion having a driving recess;*
  *b) a knob having a top annular surface, an outer surface, and an inner surface comprising knob material, said knob material filling said chamfer and;*
  *c) said protrusions mated integrally with said inner surface of said knob to thereby rigidly secure said head portion to said knob, and;*
  *d) wherein said top annular surface of said knob defines an opening for driver access to said driving recess of said head portion of said screw; and*
  *e) a ferrule having a first end and a second end through which said shaft extends, said ferrule having a panel attachment means at said first end to secure the captive screw to the panel, wherein said screw can slide axially relative to said ferrule between a retracted position and an extended position.*

\* \* \* \* \*